(No Model.)  2 Sheets—Sheet 1.

W. A. SWEET.
ELLIPTIC SPRING.

No. 383,329.  Patented May 22, 1888.

Witnesses,
C. H. Smith,
H. P. Denison.

W. A. Sweet, Inventor.

(No Model.) 2 Sheets—Sheet 2.

W. A. SWEET.
ELLIPTIC SPRING.

No. 383,329. Patented May 22, 1888.

UNITED STATES PATENT OFFICE.

WILLIAM A. SWEET, OF SYRACUSE, NEW YORK.

ELLIPTIC SPRING.

SPECIFICATION forming part of Letters Patent No. 383,329, dated May 22, 1888.

Application filed February 16, 1888. Serial No. 264,193. (No model.)

*To all whom it may concern:*

Be it known that I, WILLIAM A. SWEET, of Syracuse, county of Onondaga, in the State of New York, a citizen of the United States, have invented certain new and useful Improvements in Springs, of which the following is a specification, reference being had to the accompanying drawings, in which—

Figure 1:
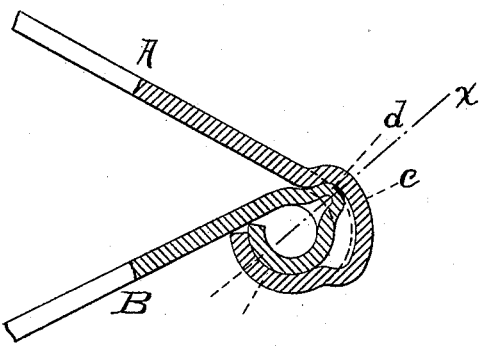
Figure 2:
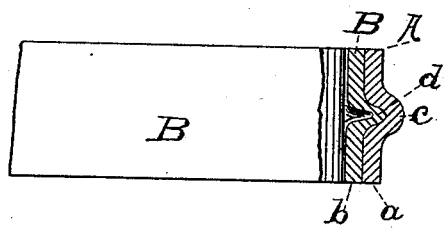
Figure 3:
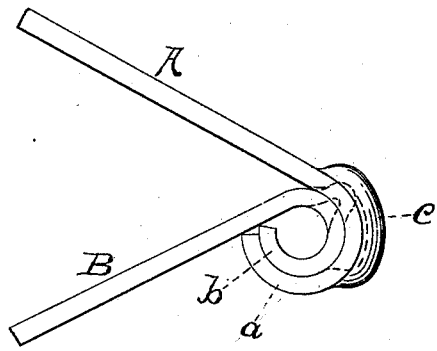
Figure 4:
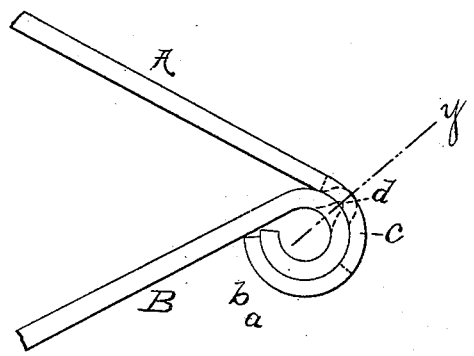
Figure 5:
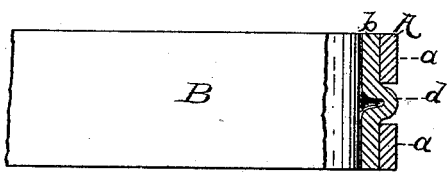
Figure 6:
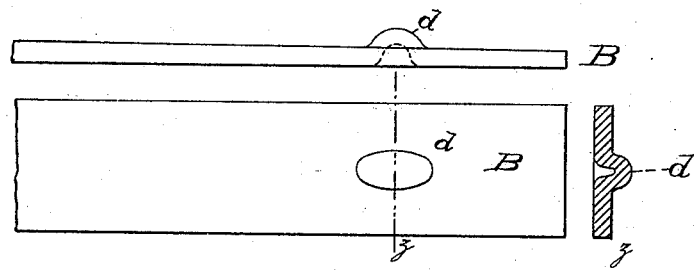
Figure 7:
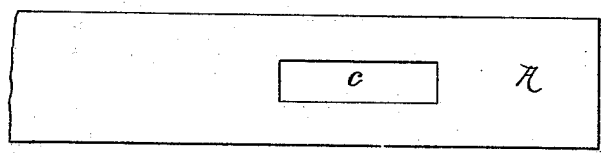

Figure 1 is a sectional elevation of one end thereof. Fig. 2 is a horizontal section on line $x\ x$, Fig. 1. Fig. 3 is a side elevation showing the lock or coupling by dotted lines. Fig. 4 is a like view of a leaf-coupling, in which the upper bed-leaf is slotted in the roll. Fig. 5 is a horizontal section on line $y\ y$, Fig. 4. Fig. 6 are details of the end of the lower bed-leaf before it is rolled at the end. Fig. 7 are details of the end of the upper bed-leaf before it is rolled at the end.

My invention relates to elliptic springs in which the ends of the bed-leaves are united by either a single or double roll joint; and my object is to so construct the roll ends of the beds as to render it unnecessary to use any cross-bolt or rivet to prevent the rolls from slipping apart sidewise.

It consists in the several novel features of construction and operation which are hereinafter described, and which are specifically set forth in the clause of claim annexed hereto.

It is constructed as follows:

A is the upper bed-leaf, the ends of which are bent or rolled to form the roll $a$. B is the lower bed-leaf, the ends of which are also bent or rolled to form the roll $b$. These rolls may be either a single or double roll.

In the inner face of the bed A, adjacent to the ends and before the rolls are formed thereon, I cut, stamp, or swage a longitudinal concavity or slot $c$; also, upon the outer face of the bed B, before rolling the ends and adjacent thereto, I form the teat $d$. I then roll the ends of the beds together with the teat in the concavity or slot, and when the beds are compressed or opened the teat will travel back and forth in the concavity or slot. The teat and concavity or slot together constitute a flexible coupling connecting the ends of the beds.

In the drawings on Sheet 1 I show a blind teat joint or coupling, and on Sheet 2 I show an open teat joint or coupling, both being in the rolls upon the ends of the beds.

The concavities $c$ constitute blind slots, and the slots $e$ are open slots.

What I claim as my invention, and desire to secure by Letters Patent, is—

The slotting and teating of the beds of a vehicle or elliptic spring, either blind or open, in a roll-joint.

In witness whereof I have hereunto set my hand this 27th day of January, 1888.

W. A. SWEET.

In presence of—
C. W. SMITH,
H. P. DENISON.